Oct. 18, 1949.　　　J. A. LINKS　　　2,484,896
CHILD'S BOOK

Filed Jan. 11, 1947　　　2 Sheets-Sheet 1

INVENTOR.
JULIAN A. LINKS
BY
Boyken, Mohler & Beckley
ATTORNEYS.

Oct. 18, 1949. J. A. LINKS 2,484,896
CHILD'S BOOK
Filed Jan. 11, 1947 2 Sheets-Sheet 2
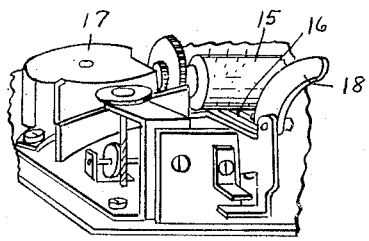
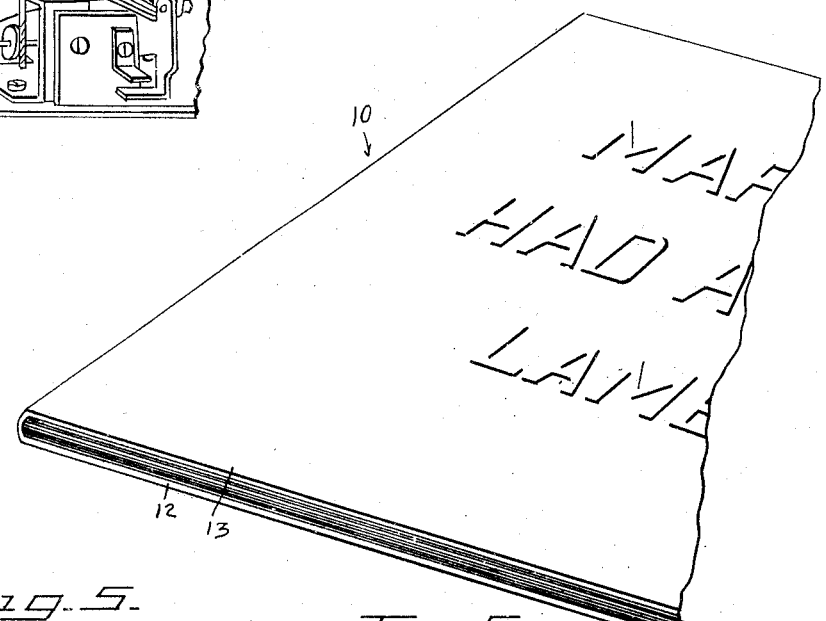
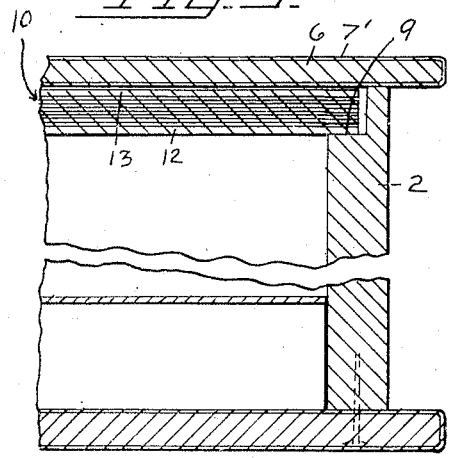
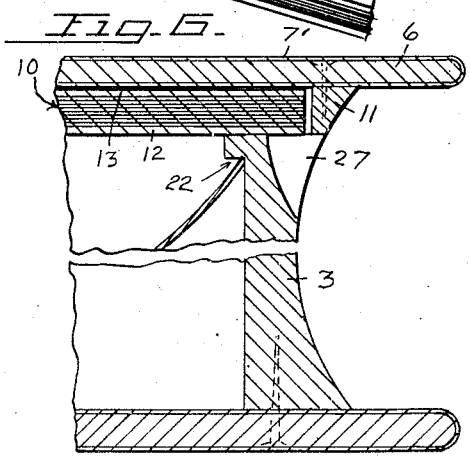
INVENTOR.
JULIAN A. LINKS
BY
ATTORNEYS Patented Oct. 18, 1949

2,484,896

UNITED STATES PATENT OFFICE 2,484,896

CHILD'S BOOK

Julian A. Links, San Francisco, Calif.

Application January 11, 1947, Serial No. 721,653

7 Claims. (Cl. 84—95)

This invention relates to a child's book and is similar in some respects to the Educational toy book shown in my copending application for United States Letters Patent, Serial No. 659,989, filed April 5, 1946.

One of the objects of this invention is the provision of a child's musical book adapted to contain a separable bound text portion, a music reproducing device adapted to automatically render a musical composition relating to a story when the book is opened and the text portion of the book is removed, and which text portion forms a closure for a removable doll or figure representing the main character of said story.

Another object of the invention is the provision of a container for a bound text, musical device, and doll, and which container simulates a book in outward appearance and is so constructed that the bound text functions as an auxiliary cover for the doll containing portion and also cooperates with the musical device for starting and stopping the latter according to whether the bound text is in the container or out of it.

The present invention provides an attractive and amusing educational book for children and is in a form in which the story portion that has the text and pictures relating to the story is removable from the main body of the book so that the child can peruse the pictures and read the text without necessarily handling the entire book, yet the bound text cooperates with the main body of the book for starting and stopping the music reproducing device in the main body of the book as well as a cover for a compartment in which a doll representative of the main character of the story is held. Upon removal of the bound text the doll that is representative of the main character in the story is uncovered and exposed to the eyes of the child simultaneously with commencement of the music that is the theme song of the story told and illustrated in the text. Also the illustrations in the text preferably substantially correspond with the appearance of the text. Thus the story is indelibly impressed upon the mind of the child together with the music and characters appropriate to the story.

Other objects and advantages will appear in the description and in the drawings.

In the drawings, Fig. 1 is a perspective view of the main book-like container open showing the doll and certain of the container structure.

Fig. 3 is a fragmentary perspective view of the bound text adapted to be held in the main container.

Fig. 4 is a perspective view of the music reproducing device showing the starter lever, one end of which appears in Fig. 1.

Fig. 5 is an enlarged fragmentary view taken along line 5—5 of Fig. 1 but with the cover closed.

Fig. 6 is an enlarged fragmentary view taken transversely across the front edge of the main body of the book-like container with the cover closed.

Figure 1:
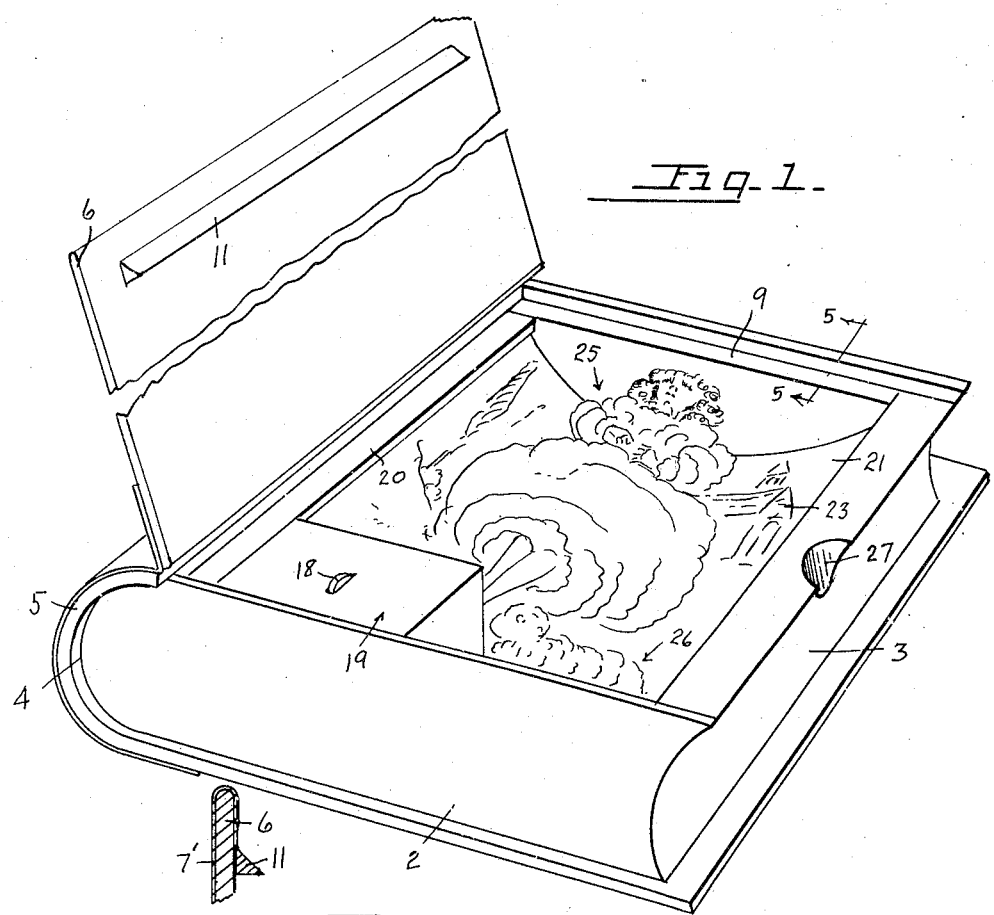

In detail the invention comprises a container having a back wall 1, a pair of opposed side walls 2, and a front side wall 3 that is opposite the back wall 1. The side walls are formed to simulate the edges of the pages of a closed book and the back wall may be a strip of half-round material having its convex side facing outwardly to simulate the back of a book in outward appearance. The side walls 2 preferably extend over the ends of the back wall 1 and the end edges of said side walls are curved as at 4 (Fig. 1) to follow the contours of arcuately extending flanges 5 that are formed at the ends of back wall 1 and that follow the curved contour of the convex side of said back wall. The ends of said side walls 2 are rigidly secured to the back wall by any suitable means, such as nails, glue, etc.

The front side wall 3 is concavely curved in cross-sectional contour on its outwardly facing side, but its inner side is preferably flat, as is the inner side of the back wall 1.

A top wall 6 is hinged along one edge to the back wall 1 and its marginal portions extend beyond the side walls 2, 3 in simulation of the top cover of a book.

The bottom wall 7 of the container is identical with the top wall 6 except that it is rigidly secured to the side walls and front wall by nails, glue, or in any other suitable manner.

In fabricating the book the top wall 6 may be initially completely covered with the paper or cloth 7' bearing thereon the title and a picture and the back wall 7 may be similarly covered, after which the side walls and back wall may be secured to the bottom wall as described. A heavy cloth strip 8 may extend over the back and hingedly secure the top wall 7 to the main body of the container. Obviously any other suitable hinge structure may be employed if desired, such as conventional hinges, but cloth is preferable inasmuch as there are no screws or nails to come loose and any possible damage is easily repaired with a suitable glue.

The upper edges of the opposed side walls 2 are rabbeted along the opposed sides of the walls to form rectangular grooves along said side walls having upwardly facing shoulders or surfaces 9 (Fig. 5) below the uppermost edges of said side walls. Also the upper edge of the front side wall 3 terminates at the same level as said surfaces 9 and said front wall is relatively thick along its upper edge (Fig. 6).

Figure 2:
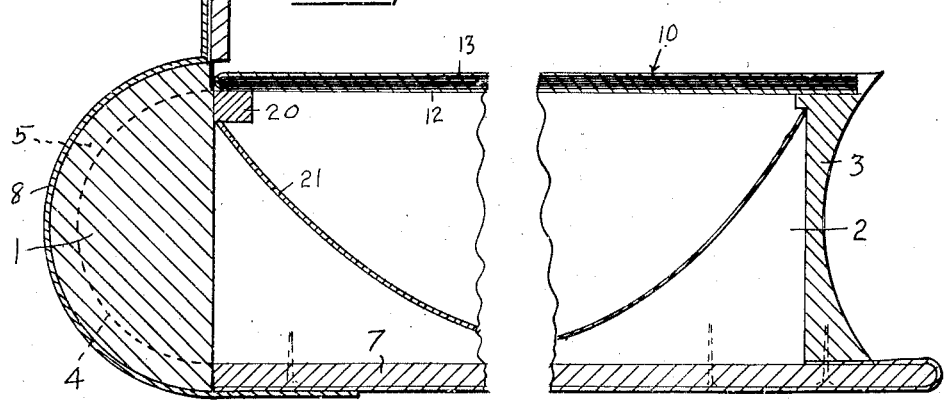
Fig. 2 is an enlarged sectional view illustrating the main book-like container with the text in place over the doll containing portion but with the doll omitted.

A bound book 10 is adapted to lie in grooves 9 and to extend over the upper surface of front wall 3 when its bound edge is against the back wall 1 (Fig. 2). Said bound book 10 (Fig. 3) carries the text and pictures relating to the desired story and is easily removable from the container inasmuch as its front edges that are over the upper edge of the front side wall 3 are exposed. Also the bound book fully lies below the top wall 6 when the latter is closed, and a strip 11 on the underside of said top wall 6 is adapted to extend over the front edges of the bound book when the cover is closed, the cross-sectional contour of said strip being curved in continuation of the curved contour of the outer side of the front side wall 3. Thus when the top wall 6 is closed the bound book is fully concealed within the container and there is no outward evidence of what is in the container.

The bound book 10 preferably has a relatively stiff back 12, and if desired it may have a stiff cover 13 (Fig. 3) as well. Thus said bound book forms a removable cover for the space below the same and it will not sag into said space due to one or both of its relatively stiff covers.

In the space below the bound book 10 and along the side wall 2 that is nearest the reader when the book is in the normal position, is an enclosed music reproducing device of the conventional type used in small music boxes in which there is a rotary drum 15 having pins projecting radially therefrom in an arrangement for plucking the ends of different toned spring steel strips 16 in an order that will render the desired tune. A clock spring in a housing 17 is connected with the drum for rotating the latter at the desired speed, and a control lever 18 that is spring-urged in an upward direction is adapted to release the spring for rotating the drum unless held down, all as described in detail in my said copending application.

The projecting end of lever 18 is adapted to be held down by the bound book 10, therefore the music reproducing device will be inoperative until the book is raised or removed, and as soon as the book is replaced after its removal the music will stop.

The outer end of control lever 18 projects through the top wall of the housing 19 that encloses the music reproducing device (Fig. 1).

A strip 20 may be positioned along the inner side of the back wall 1 with its top surface flush with the upper surfaces 9 of the grooves in side walls 2 and with the top wall of housing 19 for supporting the bound edge of book 10. Thus all four margins of book 10 are supported.

Extending between the rear wall 1 and the front side 3 is a bowed sheet 21 having its concave side facing upwardly and supported centrally between its side edges on bottom 7 with its side edges respectively sprung below strip 20 and into a right angle groove 22 in the flat side of side 3 adjacent the upper side of the latter. This sheet may carry an appropriate scene 23 imprinted on its concave upwardly facing side, and said concave side also forms a cradle for a doll 25 that is representative of the leading character in the story told in the bound book 10.

The book illustrated in the drawings is intended to depict the well-known story of Mary and her lamb. The doll 25 represents Mary and a lamb 26 may also be in the container. The music reproducing device is adapted to render the ditty or jingle "Mary Had a Little Lamb" and text of the bound book 10 tells the story of Mary and her lamb with suitable illustrations.

Upon opening the book cover 6 the child will first see the bound book 10 which conceals and protects the dolls therebelow and which book cannot fall out of the body of the container unless the top cover is opened.

The next operation of the child is to remove the bound book 10 whereupon the dolls are exposed and the music reproducing device commences playing the music suitable to the dolls and the story.

To facilitate removal of the book, a finger notch 27 may be cut along the upper edge of the front wall 2 (Figs. 1, 6) so that the book 10 may be readily grasped along the said front wall for lifting out.

It is pertinent to note that the book 10 forms a removable cover for the doll and lamb, as well as extending over the music box, while the top 6 of the main box which is secured to the box, will enclose said book when the top 6 is closed. In this manner, the doll is protected, and the book 10 is not readily lost.

I claim:

1. A child's musical book comprising a hollow, generally rectangular container having a top and a bottom wall respectively simulating in appearance the top and bottom covers of a book, side walls rigid with said bottom wall simulating in appearance the edges of the leaves of such book, and a back wall simulating in appearance the back of such book, means hingedly securing said top wall to said back wall, a bound story book separable from said container having pictures and text relating to fictional story book characters, a figure within said container removable therefrom, said bound book extending completely over said figure below said top wall, means for securing said book from separation from said container when said top wall is closed, a spring wound music reproducing device in said container rigid therewith and below said bound book, means movable to a position releasing said spring for actuating said device upon removal of said bound book from said container, said means being held stationary securing said spring against said actuation when said book is in said container.

2. A child's musical book comprising a hollow, generally rectangular container having a top and a bottom wall respectively simulating in appearance the top and bottom covers of a book, side walls rigid with said bottom wall simulating in appearance the edges of the leaves of such book and a back wall simulating in appearance the back of such book when the latter is closed, means hingedly securing said top wall to said back wall, said top wall being supported on the opposed side walls that extend away from said back wall, the edges of said opposed side walls along their opposed sides being rabbeted to form upwardly facing shoulders spaced from said top wall, a bound book supported on said shoulders spaced above said bottom wall and removable from said container, a figure removable from said container positioned between said bound book and said bottom wall and a spring actuated music reproducing device along one of said pair of opposed side walls rigidly secured to said bottom wall, a starter for said spring held by said bound book from actuation for starting said device and automatically immovable to a position releasing said spring for actuation of said device upon removal of said bound book.

3. In a container simulating a book in outward appearance and containing a musical device adapted to reproduce a piece of music, a cover for said container hingedly secured thereto and simulating in appearance the front cover of said book, a spring for actuating said device, a lever for holding said spring from so actuating said device and automatically movable upon release of said lever for releasing said spring, a bound book removable from said container supported between said cover and said device in a position holding said lever against movement to a position releasing said spring, means for so supporting said bound book.

4. In a container simulating a book in outward appearance and containing a musical device adapted to reproduce a piece of music, a cover for said container hingedly secured thereto and simulating in appearance the front cover of said book, a spring for actuating said device, a lever for holding said spring from so actuating said device and automatically movable upon release of said lever for releasing said spring, a bound book removable from said container supported between said cover and said device in a position holding said lever against movement to a position releasing said spring, means for so supporting said bound book, and supporting said bound book spaced from the side of the container opposite said cover to provide a space for a figure or other object representation of a character depicted by the text in said bound book and said bound book having a text and pictures descriptive of a child's story book character.

5. In a container simulating a book in outward appearance and containing a spring wound musical device adapted to reproduce a piece of music, said container having a back wall, a pair of opposed side walls extending from said back and a side wall opposite said back, said side walls being adapted to represent the edges of the leaves of a closed book and said back wall being generally semi-cylindrical in shape with its convex side facing outwardly to simulate the appearance of the back of a book, a bottom for said container rigidly secured to said side walls and cover and simulating the back cover of a book and a top wall hingedly secured to said back wall along one of its edges and simulating the top cover of said book, the said top wall being adapted to be flat along the upper edges of said pair of opposed side walls when said cover is closed and said upper edges being rabbeted along the opposedly facing sides of said pair of side walls forming similar rectangular grooves, opening outwardly at their ends that are remote from said back wall, said side wall that is opposite said back wall having its upper edge even with the lower sides of said groove, a bound book slidable into and out of said groove on said lower sides of the latter when said top wall is swung open and a strip on said top wall extending over said open ends of said grooves when said top wall is closed for retaining said bound book in said container and on said lower sides of said grooves.

6. A child's musical book comprising a hollow, generally rectangular container having a top and a bottom wall respectively simulating in appearance the top and bottom covers of a book, side walls rigid with said bottom wall simulating in appearance the edges of the leaves of said book with a back wall simulating in appearance the back of such book, means hingedly securing said top wall to said back wall, a bound story book separable from said container positioned within said container below said top wall, a false lower wall curved from said back wall to the side wall opposite thereto with its concave side facing upwardly, means removably securing said false liner wall within said container below said bound book, and a doll centrally and loosely supported on said concave side of said false wall against lateral rolling in said container.

7. A child's musical book comprising a hollow, generally rectangular container having a top and a bottom wall respectively simulating in appearance the top and bottom covers of a book, side walls rigid with said bottom wall simulating in appearance the edges of the leaves of said book with a back wall simulating in appearance the back of such book, means hingedly securing said top wall to said back wall, a bound story book separable from said container positioned within said container below said top wall, a false lower wall curved from said back wall to the side wall opposite thereto with its concave side facing upwardly, means removably securing said false liner wall within said container below said bound book, and a doll centrally and loosely supported on said concave side of said false wall against lateral rolling in said container, means formed in said side walls and means on said top wall for holding said bound book within said container and spaced above said doll when said top wall is closed.

JULIAN A. LINKS.

REFERENCES CITED

The following references are of record in the file of this patent:

UNITED STATES PATENTS

| Number | Name | Date |
|---|---|---|
| 1,490,295 | Stephens | Apr. 15, 1924 |
| 1,729,518 | Newman | Sept. 24, 1929 |
| 1,734,770 | Kagan | Nov. 5, 1929 |

FOREIGN PATENTS

| Number | Country | Date |
|---|---|---|
| 4,312 | Switzerland | Dec. 23, 1891 |